(12) United States Patent
Hokai et al.

(10) Patent No.: US 12,337,872 B2
(45) Date of Patent: Jun. 24, 2025

(54) CONTROL SYSTEM, CONTROL METHOD, AND NON-TRANSITORY COMPUTER READABLE RECORDING MEDIUM

(71) Applicant: TOYOTA JIDOSHA KABUSHIKI KAISHA, Toyota (JP)

(72) Inventors: Keisuke Hokai, Gotemba (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/242,578

(22) Filed: Sep. 6, 2023

(65) Prior Publication Data

US 2024/0124021 A1 Apr. 18, 2024

(30) Foreign Application Priority Data

Oct. 18, 2022 (JP) .................................. 2022-166722

(51) Int. Cl.
*B60W 60/00* (2020.01)
*B60W 30/14* (2006.01)
*B60W 50/14* (2020.01)

(52) U.S. Cl.
CPC ...... *B60W 60/0015* (2020.02); *B60W 30/146* (2013.01); *B60W 50/14* (2013.01); *B60W 2050/143* (2013.01); *B60W 2556/10* (2020.02); *B60W 2556/20* (2020.02); *B60W 2556/50* (2020.02)

(58) Field of Classification Search
CPC ... B60W 2050/021; B60W 2050/0215; B60W 2050/0292; B60W 2050/143; B60W 2554/20; B60W 2554/80; B60W 2556/10; B60W 2556/20; B60W 2556/25; B60W 2556/40; B60W 2556/50; B60W 30/146;
(Continued)

(56) References Cited

U.S. PATENT DOCUMENTS 10,990,101 B2 * 4/2021 Zhu ...................... B60W 30/12
11,591,011 B1 * 2/2023 Churukian ............... B62D 6/00
(Continued)

FOREIGN PATENT DOCUMENTS

CN 112945251 B * 6/2022 ............ B60W 30/10
EP 3798575 A1 * 3/2021 ............ B60W 40/06
(Continued)

*Primary Examiner* — Babar Sarwar
(74) *Attorney, Agent, or Firm* — Dinsmore & Shohl LLP (57) ABSTRACT

A control system according to the present disclosure comprises one or more memories and one or more processors. The one or more memories are configured to store observation data detected by one or more sensors installed in a moving body and an estimated position of the moving body. The one or more processors are configured to execute the following first to third processes. The first process is calculating the estimated position at a current time based on at least the estimated position calculated in a previous process and the observation data up to the current time. The second process is recalculating the estimated position at a past predetermined time. The third process is evaluating accuracy of the estimated position at the current time based on a difference between the estimated position at the past predetermined time stored in the memory and the recalculated estimated position.

5 Claims, 5 Drawing Sheets

(58) Field of Classification Search
 CPC ............... B60W 50/029; B60W 50/14; B60W 60/0015; G01C 21/28
 See application file for complete search history.

(56) References Cited

U.S. PATENT DOCUMENTS

| | | | | |
|---|---|---|---|---|
| 2002/0177947 | A1* | 11/2002 | Cayford | G08G 1/096811 701/445 |
| 2010/0191461 | A1* | 7/2010 | Zeng | G01S 13/931 701/532 |
| 2014/0028447 | A1* | 1/2014 | Howard | G06F 16/00 340/10.6 |
| 2015/0175070 | A1* | 6/2015 | Attard | B60W 50/14 340/439 |
| 2018/0281789 | A1* | 10/2018 | Oyama | B60W 10/20 |
| 2018/0281790 | A1* | 10/2018 | Oyama | G05D 1/0274 |
| 2018/0356492 | A1* | 12/2018 | Hamilton | G01S 13/76 |
| 2019/0154842 | A1* | 5/2019 | Adachi | G01C 21/36 |
| 2019/0323844 | A1* | 10/2019 | Yendluri | G01S 17/86 |
| 2019/0324463 | A1* | 10/2019 | Zhu | B60W 10/04 |
| 2020/0120450 | A1* | 4/2020 | Lee | G08G 1/127 |
| 2020/0172093 | A1* | 6/2020 | Kum | G06N 3/047 |
| 2020/0207342 | A1* | 7/2020 | Hsu | B60W 50/0097 |
| 2020/0307640 | A1* | 10/2020 | Tsuji | G05D 1/0268 |
| 2021/0078593 | A1* | 3/2021 | Lee | G05D 1/0011 |
| 2021/0243595 | A1* | 8/2021 | Buck | G06F 21/604 |
| 2022/0066043 | A1* | 3/2022 | Nagasawa | G01S 19/17 |
| 2022/0074757 | A1* | 3/2022 | Edelman | G01C 21/3644 |
| 2022/0117218 | A1* | 4/2022 | Sibley | B23K 26/0884 |
| 2022/0299656 | A1* | 9/2022 | Cui | G01C 21/165 |
| 2023/0005349 | A1* | 1/2023 | Beigel | G01S 5/019 |
| 2023/0204384 | A1* | 6/2023 | Kong | G01S 17/06 701/408 |
| 2024/0028046 | A1* | 1/2024 | Vrba | G05D 1/027 |
| 2024/0221506 | A1* | 7/2024 | Ogata | G06V 20/56 |

FOREIGN PATENT DOCUMENTS

| | | | | |
|---|---|---|---|---|
| EP | 4130800 | A1 * | 2/2023 | ......... G01C 21/3848 |
| JP | 2018-173303 | A | 11/2018 | |
| JP | 2018-173304 | A | 11/2018 | |
| JP | 2022054223 | A * | 4/2022 | |
| WO | WO-2016130719 | A2 * | 8/2016 | ............ B60W 30/10 |
| WO | WO-2022139933 | A1 * | 6/2022 | ......... G01C 21/3811 |

* cited by examiner

CONTROL SYSTEM, CONTROL METHOD, AND NON-TRANSITORY COMPUTER READABLE RECORDING MEDIUM

CROSS-REFERENCE TO RELATED APPLICATION

The present application claims priority under 35 U.S.C. § 119 to Japanese Patent Application No. 2022-166722, filed Oct. 18, 2022, the contents of which application are incorporated herein by reference in their entirety.

BACKGROUND

Technical Field

The present disclosure relates to a technique for controlling a moving object based on an estimated position.

Background Art

Patent Document 1 discloses a traveling controller configured to execute:
computing control information based on map information, positioning information, and lane line information;
performing the traveling control of a vehicle based on the control information;
calculating a plurality of estimated positions on a basis of a plurality of computing methods that are based on information on a most-recent position on the map information of the vehicle;
calculating estimated position reliability based on a result of a comparison between pieces of positional information including information on one or more the plurality of estimated positions; and
continuing the traveling control until the estimated position reliability becomes equal to or less than a threshold when the lane line information is unobtainable.

Other documents showing the technical level of the technical field according to the present disclosure include the following Patent Literature 2 and Patent Literature 3.

LIST OF RELATED ART

Patent Literature 1: JP 2018/173304 A
Patent Literature 2: JP 2018/173303 A
Patent Literature 3: JP 2022/054223 A

SUMMARY

A localization which estimates the position of a moving body is one of important processes in control of the moving body such as autonomous driving control. In particular, the accuracy of an estimated position obtained by the localization greatly affects the control performance. For this reason, there is a demand for a technique which enables a moving body to evaluate the accuracy of its estimated position by itself.

According to the technique disclosed in Patent Literature 1, the accuracy (estimated position reliability) of the estimated position is calculated by comparing some combinations of a plurality of estimated positions calculated by a plurality of computing methods with each other. And the control is stopped when any of the accuracies (estimated position reliabilities) of the estimated positions calculated for some combinations is equal to or less than a threshold. However, it is generally possible that estimated positions calculated by different calculation methods are different from each other. Further, when one of the estimated positions is abnormal, the control is stopped even if the other estimated position is normal. As described above, the technique disclosed in Patent Literature 1 may fail to ensure sufficient usability. Furthermore, since it is necessary to adapt the control to the plurality of computing methods, it is difficult to design the control according to the moving body.

In view of the above problems, an object of the present disclosure is to provide a technique that enables a moving body to evaluate the accuracy of its estimated position by itself.

A first aspect of the present disclosure is directed to a control system for controlling a moving body based on an estimated position of the moving body.

The control system according to the first aspect comprises:
one or more memories storing observation data based on information detected by one or more sensors installed in the moving body, and the estimated position; and
one or more processors.

The one or more processors are configured to execute:
calculating the estimated position at a current time based on at least the estimated position calculated in a previous process and the observation data up to the current time;
recalculating the estimated position at a past predetermined time based on the estimated position up to the current time stored in the memory and the observation data up to the current time; and
evaluating accuracy of the estimated position at the current time based on a difference between the estimated position at the past predetermined time stored in the memory and the recalculated estimated position at the past predetermined time.

A second aspect of the present disclosure is directed to a control method for controlling a moving body based on an estimated position of the moving body.

The control method according to the second aspect includes:
storing and managing, in one or more memories, observation data based on information detected by one or more sensors installed in the moving body, and the estimated position;
calculating the estimated position at a current time based on at least the estimated position calculated in a previous process and the observation data up to the current time;
recalculating the estimated position at a past predetermined time based on the estimated position up to the current time stored in the memory and the observation data up to the current time; and
evaluating accuracy of the estimated position at the current time based on a difference between the estimated position at the past predetermined time stored in the memory and the recalculated estimated position at the past predetermined time.

A third aspect of the present disclosure is directed to a control program for controlling a moving body based on an estimated position of the moving body.

The control program according to the third aspect, when executed by a computer, causes the computer to execute:
storing and managing, in one or more memories, observation data based on information detected by one or more sensors installed in the moving body, and the estimated position;

calculating the estimated position at a current time based on at least the estimated position calculated in a previous process and the observation data up to the current time;

recalculating the estimated position at a past predetermined time based on the estimated position up to the current time stored in the memory and the observation data up to the current time; and evaluating accuracy of the estimated position at the current time based on a difference between the estimated position at the past predetermined time stored in the memory and the recalculated estimated position at the past predetermined time.

According to the present disclosure, the estimated position of the moving object at a current time is calculated based on at least the estimated position calculated in a previous process and the observation data up to the current time point. On the other hand, the estimated position of the moving object at a past predetermined time is recalculated based on the estimated position up to the current time and the observation data up to the current time. Then, the accuracy of the estimated position of the moving body at the current time is evaluated based on the difference between the estimated position that had been calculated at the past predetermined time and the recalculated estimated position. As described above, according to the present disclosure, it is possible to enable the moving body to evaluate the accuracy of the its estimated position at the current time for control by itself. Further, it is not necessary to apply a plurality of computing methods, and it is possible to be easily applied to the control without reducing usability.

DETAILED DESCRIPTION

The present disclosure relates to controlling a moving body. Examples of the moving body include vehicles, robots, and the like. The moving body may be capable of autonomous travel. The vehicle may be an autonomous driving vehicle. As an example, the case where the moving body is a vehicle is considered in the following description. In the case of generalization, "vehicle" in the following description is replaced with "moving body".

1. Control System

Figure 1:
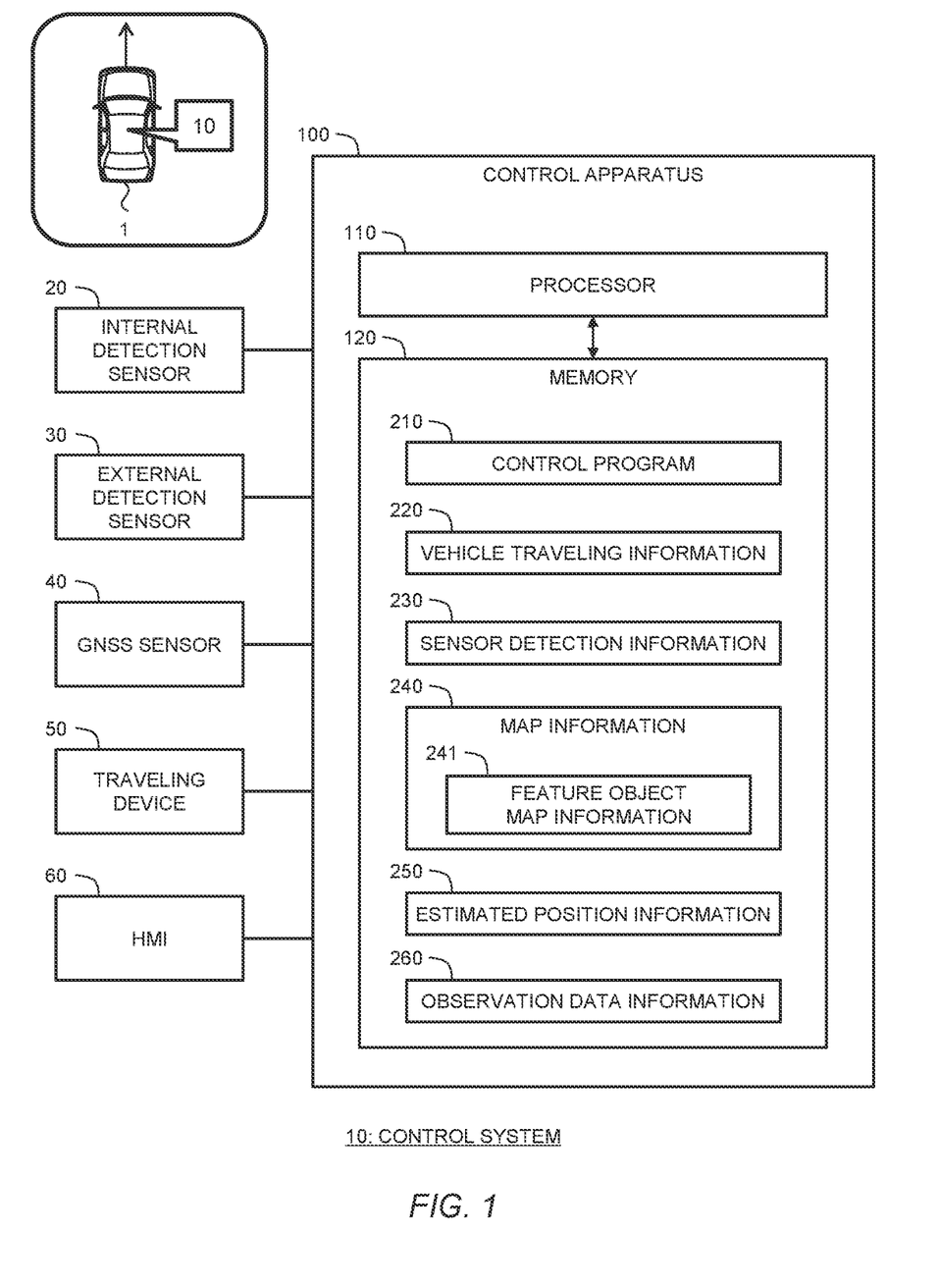
FIG. 1 is a block diagram showing a configuration of a control system according to the present embodiment.

FIG. 1 is a block diagram illustrating a configuration of a control system 10 according to the present embodiment. The control system 10 controls the vehicle 1. The control system 10 includes an internal detection sensor 20, an external detection sensor 30, a global navigation satellite system (GNSS) sensor 40, a traveling device 50, a HMI 60, and a control device 100.

The internal detection sensor 20 is mounted on the vehicle 1 and detects the traveling state of the vehicle 1. Examples of the internal detection sensor 20 include a vehicle speed sensor (wheel speed sensor), a steering angle sensor, an acceleration sensor, and a yaw rate sensor.

The external detection sensor 30 is mounted on the vehicle 1 and detects a situation around the vehicle 1. Examples of the external detection sensor 30 include LiDAR (Laser Imaging Detection and Ranging), a camera, and a radar.

The GNSS sensor 40 measures the position of the vehicle 1 by receiving signals from satellites.

The traveling device 50 includes a steering device, a drive device and a braking device. The steering device steers wheels. The driving device generates a driving force. The braking device generates a braking force.

The HMI 60 includes devices that provide HMI functionality of the vehicle 1. Examples of the HMI 60 include a display, a speaker, a touch panel, and the like.

The control apparatus 100 is a computer that controls the vehicle 1. At least, the control apparatus 100 provides functions of estimating a position of the vehicle 1 and controlling traveling of the vehicle 1 based on the estimated position of the vehicle 1. For example, the control device 100 is an electronic control unit (ECU) that provides an automatic driving function of the vehicle 1.

The control device 100 includes one or more processors 110 (hereinafter, simply referred to as processor 110) and one or more memories 120 (hereinafter, simply referred to as memory 120). The processor 110 executes various processes to be described later. For example, the processor 110 can be configured by a central processing unit (CPU) including an arithmetic unit, a register, and the like. The memory 120 stores various kinds of information. For example, the memory 120 can be configured by recording media such as a volatile memory, a non-volatile memory, a hard disk drive (HDD), and a solid-state drive (SSD). Typically, the control apparatus 100 is mounted on the vehicle 1. Alternatively, a part of the control device 100 may be disposed in an external device outside the vehicle 1 to remotely control the vehicle 1.

The memory 120 stores a control program 210, vehicle traveling information 220, sensor detection information 230, map information 240, estimated position information 250, observation data information 260, and the like.

The control program 210 is a computer program for controlling the vehicle 1. When the processor 110 executes the control program 210, various processes by the control apparatus 100 are realized. The control program 210 may be recorded on computer-readable recording media.

The vehicle traveling information 220 is information detected by the internal detection sensor 20 and indicates a traveling state of the vehicle 1. Examples of the traveling state of the vehicle 1 include vehicle speeds, steering angles, accelerations, yaw rates, and the like.

The sensor detection information 230 is information detected by the external detection sensor 30. For example, the sensor detection information 230 includes point cloud information obtained by the LiDAR. As another example, the sensor detection information 230 may include an image captured by a camera.

Further, the sensor detection information 230 includes object information about objects around the vehicle 1. Examples of the object around the vehicle 1 include a pedestrian, another vehicle, and a characteristic object. Examples of the feature object include a white line, a curb, a pole, a telephone pole, a signboard, a sign, and a corner of a building. The feature object is used in estimation of the position of the vehicle 1 to be described later. The object information includes at least a relative position of the object with respect to the vehicle 1. For example, it is possible to recognize an object and acquire a relative position and a relative speed of the object based on point group information obtained by the LiDAR.

The map information 240 includes a general navigation map. In order to estimate the position of the vehicle 1 to be described later, the map information 240 includes characteristic object map information 241 for managing information on characteristic objects on the map. The feature object map information 241 manages at least information on the position (absolute position) of the feature object in the absolute coordinate system on the map. Further, the feature object map information 241 may manage information (class, attribute, shape, and the like) for specifying the feature object. The characteristic object map information 241 may be given in advance in accordance with an environment to which the control system 10 according to the present embodiment is applied.

In addition, the map information 240 may include information used for controlling the vehicle 1. For example, the map information 240 may include information such as the shape, height, and brightness of a road surface on the map, and information such as the shape and attribute of a structure on the map.

As will be described later, the processor 110 executes a process of estimating the position (absolute position) of the vehicle 1 at a predetermined cycle. Hereinafter, the position of the vehicle 1 is simply referred to as a "vehicle position". The estimated position information 250 manages the vehicle position (estimated position) estimated by the processing executed by the processor 110.

Here, the vehicle position is typically represented by a coordinate position in an absolute coordinate system on a map. Further, the vehicle position may include the attitude (roll angle, pitch angle, and yaw angle) of the vehicle 1. In this case, the vehicle position is generally represented by a vector having six elements. Alternatively, the vehicle position can be represented by a rigid transformation matrix with respect to a reference coordinate position and attitude. For example, assuming that a translation vector having a size of 3×1 representing parallel movement with respect to a reference three dimensional coordinate position is r and a rotation matrix having a size of 3×3 representing rotation with respect to the attitude of the vehicle 1 of the reference three axes is R, the vehicle position can be represented by a rigid transformation matrix P having a size of 4×4 in the following formula. In this case, the vector representation of the coordinate position of the vehicle position is obtained by applying the rigid transformation matrix to the vector representing the reference coordinate position. The attitude of the vehicle 1 at the vehicle position is obtained by applying the rotation matrix R to the attitude of the vehicle 1 serving as a reference.

$$P = \begin{bmatrix} R & r \\ 0 & 1 \end{bmatrix} \quad \text{Formula 1}$$

The observation data information 260 manages observation data based on the vehicle traveling information 220 and the sensor detection information 230 as time-series data. Examples of the observation data include a movement amount (displacement amount) of the vehicle 1, an absolute position of a characteristic object detected around the vehicle 1, and the like. Alternatively, the observation data may be the vehicle traveling information 220 or the sensor detection information 230 at each time.

2. Processing

Hereinafter, processing executed by the control apparatus 100, more specifically, processing executed by the processor 110 will be described.

2-1. Localization Processing

The processor 110 executes a process (self-position estimation process) of calculating the estimated position of the vehicle 1 at the current time based on the estimated position of the vehicle 1 calculated in the previous process and the observation data up to the current time. However, the initial value of the estimated position may be, for example, a value obtained by the GNSS sensor 40. The processor 110 can acquire the estimated position calculated in the previous processing by referring to the estimated position information 250. In addition, the processor 110 can acquire observation data up to the current time point by referring to the observation data information 260.

An example of the localization process executed by the processor 110 will be described below.

First, the processor 110 calculates a rough vehicle position (hereinafter referred to as a "pre-estimated position") based on the vehicle travel information 220 and the estimated position calculated in the previous processing. For example, the processor 110 calculates the movement amount of the vehicle 1 from the estimated position calculated in the previous processing based on the steering angle of the vehicle 1 and the vehicle speed, and calculates the pre-estimated position based on the movement amount. In addition, for example, the processor 110 calculates the prior estimated position from a state equation configured with the vehicle position as a state and the vehicle travel information 220 as an explanatory variable.

Next, the processor 110 recognizes a characteristic object around the vehicle 1 based on the sensor detection information 230. Further, the processor 110 estimates the absolute position of the recognized feature object by combining the calculated pre-estimated position and the relative position of the recognized feature object. The processor 110 associates the recognized feature object with the feature object managed by the feature object map information 241 on the basis of the object information of the recognized feature object. Thereafter, the processor 110 corrects the pre-estimated position of the recognized characteristic object so that the estimated absolute position and the absolute position obtained from the characteristic object map information 241 coincide with each other as much as possible. Then, the processor 110 sets the vehicle position obtained by correcting the pre-estimated position as the processing result of the localization processing (the estimated position of the vehicle 1 at the current time point). For example, the processor 110 calculates the estimated position of the vehicle 1 at the current time by correcting the pre-estimated position using a particle filter, a Kalman filter, or the like with the vehicle position as a state. In this case, the estimated position is generally a probability distribution with the vehicle position as a random variable. In this particular case, the processor 110 may be considered to be estimating a filtered distribution of the vehicle position. In this sense, the localization processing can also be referred to as "filter distribution estimation processing".

As an example, the processor 110 executes the localization process. The processor 110 stores the estimated position of the vehicle 1 at the current time point obtained by executing the localization process in the memory 120 as the estimated position information 250. The processor 110 the processor stores observation data obtained when the localization process is executed in the storage memory 120 as observation data information 260. For example, the processor 110 stores the movement amount of the vehicle 1, the relative position of the recognized feature object, the absolute position obtained from the characteristic feature object map information 241 of the recognized feature object, and the like in the memory 120 as the observation data information 260.

2-2. Re-Estimation Processing

The processor 110 executes a process (re-estimation process) of recalculating the estimated position of the vehicle 1 at a past predetermined time point based on the estimated position of the vehicle 1 up to the current time point and the observation data up to the current time point. The processor 110 can acquire the estimated position of the vehicle 1 up to the current point in time by referring to the estimated position information 250.

For example, the re-estimation process can be performed so as to minimize a cost function configured based on the estimated position of the vehicle 1 up to the current time point and the observation data up to the current time point. An example of the re-estimation process executed by the processor 110 will be described below with reference to FIG. 2.

Figure 2:
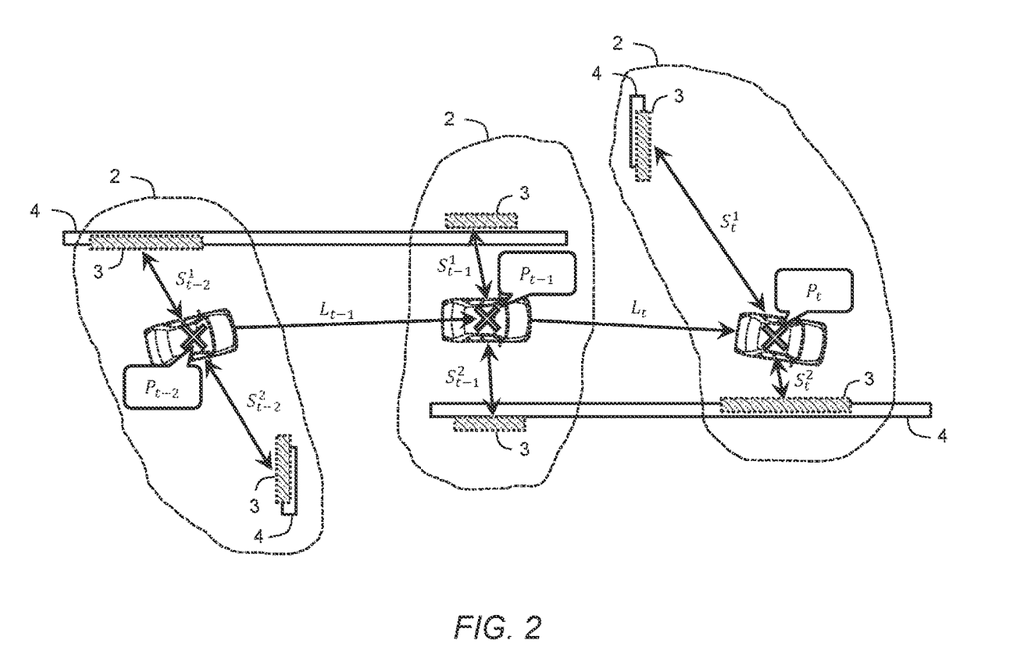
FIG. 2 is a conceptual diagram for explaining an example of re-estimation processing.

FIG. 2 illustrates the estimated position ($P_{t-2}$, $P_{t-1}$, $P_t$), the detection range 2 of the external detection sensor 30, the recognized characteristic object 3, the characteristic object 4 managed by the characteristic object map information 241, the relative position ($S^k_{t-2}$, $S^k_{t-1}$, $S^k_t$) of the recognized characteristic object 3 with respect to the vehicle 1, and the displacement amount ($L_{t-1}$, $L_t$) of the vehicle 1 from the previous time point with respect to the current time point t and the past time points t−1 and t−2. Here, it is assumed that the estimated position ($P_{t-2}$, $P_{t-1}$, $P_t$) and the displacement amount ($L_{t-1}$, $L_t$) of the vehicle 1 from the previous time point are represented by a rigid transformation matrix. The rigid transformation matrix for the displacement amount of the vehicle 1 can be configured by representing the change in the posture of the vehicle 1 from the previous time point detected by the internal detection sensor 20 by a rotation matrix R and representing the movement amount of the vehicle 1 by a translation vector r.

Now, a case where the estimated position $P_{t-1}$ of the vehicle 1 at the past time point t−1 is recalculated will be considered. In this case, $\xi^2$ of the following formula can be given as a cost function.

Formula 2

$$\xi^2 = \xi^2_{in} + \xi^2_{ex}$$

$$\xi^2_{in} = \sum_{i=0,1} \{\Theta((L_{t-i})^{-1} P_{t-i}(P_{t-i-1})^{-1})^T (\Omega_{in})^{-1} \Theta((L_{t-i})^{-1} P_{t-i}(P_{t-i-1})^{-1})\}$$

$$\xi^2_{ex} = \sum_{i=0,1,2} \sum_{k \in \{\Lambda_{t-i}\}} \{d(f(S^k_{t-i}, P_{t-i}), f^k_m)^T (\Omega_{ex})^{-1} d(f(S^k_{t-i}, P_{t-i}), f^k_m)\}$$

Here, $\Theta$ is a vector value function whose return value is a vector including the translation vector r of the rigid transformation matrix of the argument and a value obtained by converting the rotation matrix R of the rigid transformation matrix of the argument into a Euler angle. However, $\Theta$ may be a vector value function whose return value is either the translation vector r of the rigid transformation matrix of the argument or a vector whose element is a value obtained by converting the rotation matrix R of the rigid transformation matrix of the argument into a Euler angle. $\Omega$ in is the variance-covariance matrix for $\Theta$. For example, $\Omega$ in may be a variance-covariance matrix determined by a probability distribution representing the error of the internal detection sensor 20. $\Omega$ in is given in advance according to the environment to which the present embodiment is applied. Therefore, $\xi^2_{in}$ gives the difference between the given estimated position and the observation data based on the information detected by the internal detection sensor 20 as the cost.

$\{\Lambda_{t-i}\}$ is a set of subscripts that give labels for distinguishing the feature objects 3 recognized at the time point t−i. That is, the number of elements of $\{\Lambda_{t-i}\}$ is the number of recognized feature objects 3. f is a function that gives the absolute position of the recognized feature object 3 from the estimated positioned of the vehicle 1 and the relative position of the recognized feature object 3. $f^k_m$ is an absolute position obtained from the characteristic feature object map information 241 of the recognized feature object 3. d is a function that gives the distance between the absolute position f calculated from the relative position of the recognized feature object 3 and the absolute position $f^k_m$ obtained from the feature object map information 241. f and $f^k_m$ are typically vectors giving a two dimensional or three dimensional coordinate position. Thus, d is typically a vector-valued function that gives the distance for each element of f and $f^k_m$. $\Omega_{ex}$ is the variance-covariance matrix for d. For example, $\Omega_{ex}$ may be a variance-covariance matrix determined by a probability distribution representing the error of the external detection sensor 30. $\Omega_{ex}$ is given in advance according to the environment to which the present embodiment is applied. Therefore, $\xi^2_{ex}$ gives the difference between the given estimated position and the observation data based on the information detected by the external detection sensor 30 as the cost.

When the cost function $\xi^2$ is given in this way, if the estimated position of the vehicle 1 at the past time point t−2 is fixed, the processor 110 can recalculate the estimated position of the vehicle 1 at the past time point t−1 by $P^{op}_{t-1}$ in the following formula. In the above description, the cost function $\xi^2$ is configured based on the estimated position of the vehicle 1 and the observation data from the past time point t−2 to the current time point. However, the cost function $\xi^2$ may be configured to be extended for a longer period.

Formula 3

$$\{P^{op}_{t-1}, P^{op}_t\} = \arg \min_{P_{t-1}, P_t} \frac{1}{2} \xi^2$$

As an example, the processor 110 performs the re-estimation process. In addition, the processor 110 can also execute re-estimation processing using a particle filter, a Kalman filter, or the like with the vehicle position as a state. In this particular case, the processor 110 may be considered to be estimating a smoothed distribution of vehicle positions. In this sense, the re-estimation processing can also be referred to as "smoothed distribution estimation processing".

2-3. Accuracy Evaluation Processing

The processor 110 executes a process (accuracy evaluation processing) of evaluating the accuracy of the estimated position of the vehicle 1 at the current time point calculated in the current process based on the magnitude of the difference between the estimated position obtained by executing the self-position estimation process (hereinafter, simply referred to as a "past calculated estimated position") and the estimated position recalculated by executing the re-estimation process (hereinafter, simply referred to as a "recalculated estimated position") with respect to the past predetermined time point to be recalculated in the re-estimation process. Here, the processor 110 can acquire the past calculated estimated position by referring to the estimated position information 250.

In the re-estimation processing, since the estimated position at the predetermined time point in the past is recalculated based on the estimated position of the vehicle 1 up to the current time point and the observation data up to the current time point, the recalculated estimated position can be expected to have higher accuracy than the estimated position at the predetermined time point. For example, it is generally known that the smoothed distribution has smaller variance and higher accuracy than the filtered distribution. Therefore, a large difference between the past calculated estimated position and the recalculated estimated position is considered to indicate a high possibility that the past calculated estimated position is erroneously estimated. The error of the estimated position at the past time point affects the accuracy of the estimated position thereafter. Therefore, the magnitude of the difference between the past calculated estimated position and the recalculated estimated position serves as an index for evaluating the accuracy of the estimated position of the vehicle 1 at the current time point calculated in the current processing.

In particular, the influence on the accuracy of the estimated position of the vehicle 1 at the time point has a greater influence on the accuracy of the estimated position of the vehicle 1 at the current time point. Therefore, it is desirable that the predetermined past time point to be recalculated in the re-estimation processing is a past time point close to the current time point by a certain degree (for example, several seconds or several hundreds of milliseconds before the current time point). However, it is not desirable to set a past time point excessively close to the current time point because the accuracy of the recalculated estimated position may not be significantly increased with respect to the past calculated estimated position.

The difference between the past calculated estimated position and the recalculated estimated position is given, for example, as follows.

When the vehicle position is represented by a vector, the difference between the past calculated estimated position and the revised estimated position may be a vector of a difference between a vector representing the past calculated estimated position and a vector representing the recalculated estimated position. When the vehicle position is a vector having the coordinate position and the attitude of the vehicle 1 as elements, the difference between the past calculated estimated position and the recalculated estimated position may be calculated separately for the coordinate position and the attitude of the vehicle 1.

When the vehicle position is represented by a rigid transformation matrix, the difference between the past calculated estimated position and the recalculated estimated position can be calculated by $P_{dif}$ in the following formula, where $P_{fil}$ is a rigid transformation matrix representing the past calculated estimated positioned and $P_{smt}$ is a rigid transformation matrix representing the recalculated estimated position. By extracting the translation vector r of $P_{dif}$, it is possible to obtain a vector representation of the difference between the past calculated estimated position and the recalculated estimated position with respect to the coordinate position. Further, by extracting the rotation matrix R of $P_{dif}$ and converting it into the Euler angle, it is possible to obtain the vector representation of the difference between the past calculated estimated position and the recalculated estimated position related to the attitude of the vehicle 1.

$$P_{dif} = P_{smt} * (P_{fil})^{-1} \qquad \text{Formula 4:}$$

In the accuracy evaluation processing, the processor 110 may be configured to detect that the accuracy of the estimated position of the vehicle 1 at the current time point is poor accuracy when the magnitude of the difference between the past calculated estimated position and the recalculated estimated position exceeds an estimated position threshold value (first threshold value). The fact that the magnitude of the difference exceeds the first threshold value can be determined, for example, from the fact that the norm of the vector representing the difference exceeds the first threshold value with the first threshold value being a scalar value. Alternatively, the first threshold value may be set as a boundary of a region in the vector space, and the determination may be made based on the fact that the vector representing the difference is outside the region. In addition, the processor 110 may be configured to detect that the localization has poor accuracy on condition that a state in which the magnitude of the difference exceeds the first threshold value continues for a certain period of time or the magnitude of the difference exceeds the first threshold value a predetermined number of times or more during a certain period of time.

When the estimated position is a probability distribution using the vehicle position as a random variable, the difference between the past calculated estimated position and the recalculated estimated position can be calculated using a Mahalanobis distance. In this case, the processor 110 can give the Mahalanobis distance (hereinafter, simply referred to as "first Mahalanobis distance") to the mean of the probability distributions of the recalculated estimated positions with respect to the probability distributions of the predetermined time-point estimated positions and the Mahalanobis distance (hereinafter, simply referred to as "second Mahalanobis distance") to the mean of the probability distributions of the predetermined time-point estimated positions with respect to the probability distributions of the recalculated estimated positions by $d_{fl2sm}$ and $d_{sm2fl}$ in the following formulas, respectively.

$$d_{fl2sm} = \sqrt{(\mu_{smt} - \mu_{fil})^T (\Sigma_{fil})^{-1} (\mu_{smt} - \mu_{fil})} \qquad \text{Formula 5}$$
$$d_{sm2fl} = \sqrt{(\mu_{fil} - \mu_{smt})^T (\Sigma_{smt})^{-1} (\mu_{fil} - \mu_{smt})}$$

Here, $\mu_{fil}$ and $\Sigma_{fil}$ are a mean and a variance-covariance matrix of a probability distribution related to the past calculated estimated position, respectively. $\mu_{smt}$ and $\Sigma_{smt}$ are a mean and a variance-covariance matrix of a probability distribution related to the recalculated estimated position, respectively.

At this time, the magnitude of the difference between the past calculated estimated position and the recalculated estimated position can be represented by the sum of one or both of the first Mahalanobis distance and the second Mahalanobis distance.

Alternatively, the magnitude of the difference between the past calculated estimated position and the recalculated estimated position can be represented by either one or both of the significant difference of the first Mahalanobis distance when the probability distribution related to the past calculated estimated position is assumed and the significant difference of the second Mahalanobis distance when the probability distribution related to the recalculated estimated position is assumed. This utilizes the fact that the square of the Mahalanobis distance follows a chi-square distribution with n degrees of freedom when the probability variable assumes an n-dimensional probability distribution. That is, assuming that the dimension of the vehicle position is n, the magnitude of the difference between the past calculated estimated position and the recalculated estimated position can be represented by the smallness of the P value obtained from the chi-square distribution of the degree of freedom n using the square of the first Mahalanobis distance or the square of the second Mahalanobis distance as a statistic. In this case, the fact that the magnitude of the difference exceeds the predetermined threshold may be rephrased as the fact that the P value falls below the predetermined threshold. The threshold value described below is the same when the magnitude of the difference is the small value of the P value.

When the magnitude of the difference between the past calculated estimated position and the recalculated estimated position is represented by both the significant difference of the first Mahalanobis distance and the significant difference of the second Mahalanobis distance, $\chi^2$ in the following formula may be used as the statistic from the reproducibility of the chi-square distribution. In other words, assuming that the dimension of the vehicle position is n, the magnitude of the difference between the estimated position and the recalculated estimated position at the predetermined time point can be represented by the smallness of the P value obtained from the chi-square distribution of the 2n of degrees of freedom using $\chi^2$ in the following formula as a statistic.

$$\chi^2 = (d_{fl2sm})^2 + (d_{sm2fl})^2 \qquad \text{Formula 6:}$$

2-4. Traveling Control Processing

The processor 110 executes a process (traveling control processing) of controlling traveling of the vehicle 1 based on the estimated position obtained by executing the localization process. The processor 110 generates a control signal for the traveling device 50 or the HMI 60 by executing the traveling control process. For example, when autonomous driving of the vehicle 1 is performed, the processor 110 generates a traveling plan including driving decision and a traveling track from the estimated position and the map information 240. Then, the processor 110 generates control signals related to acceleration, braking, and steering so that the vehicle 1 travels according to the generated traveling plan.

In particular, the processor 110 may be configured to execute the process of performing the emergency control according to the magnitude of the difference between the past calculated estimated position and the recalculated estimated position in response to the detection of the poor accuracy of the estimated position of the vehicle 1 at the current time point in the accuracy evaluation process. Examples of the emergency control include an interruption procedure of autonomous driving, issuance of an alarm to an operator of the vehicle 1, control for performing evacuation by deceleration, and control for performing evacuation by stop. With this configuration, when the poor accuracy of the estimated position of the vehicle 1 at the current time point is detected, it is possible to prevent the control from being continued with the estimated position being incorrect.

Figure 3:
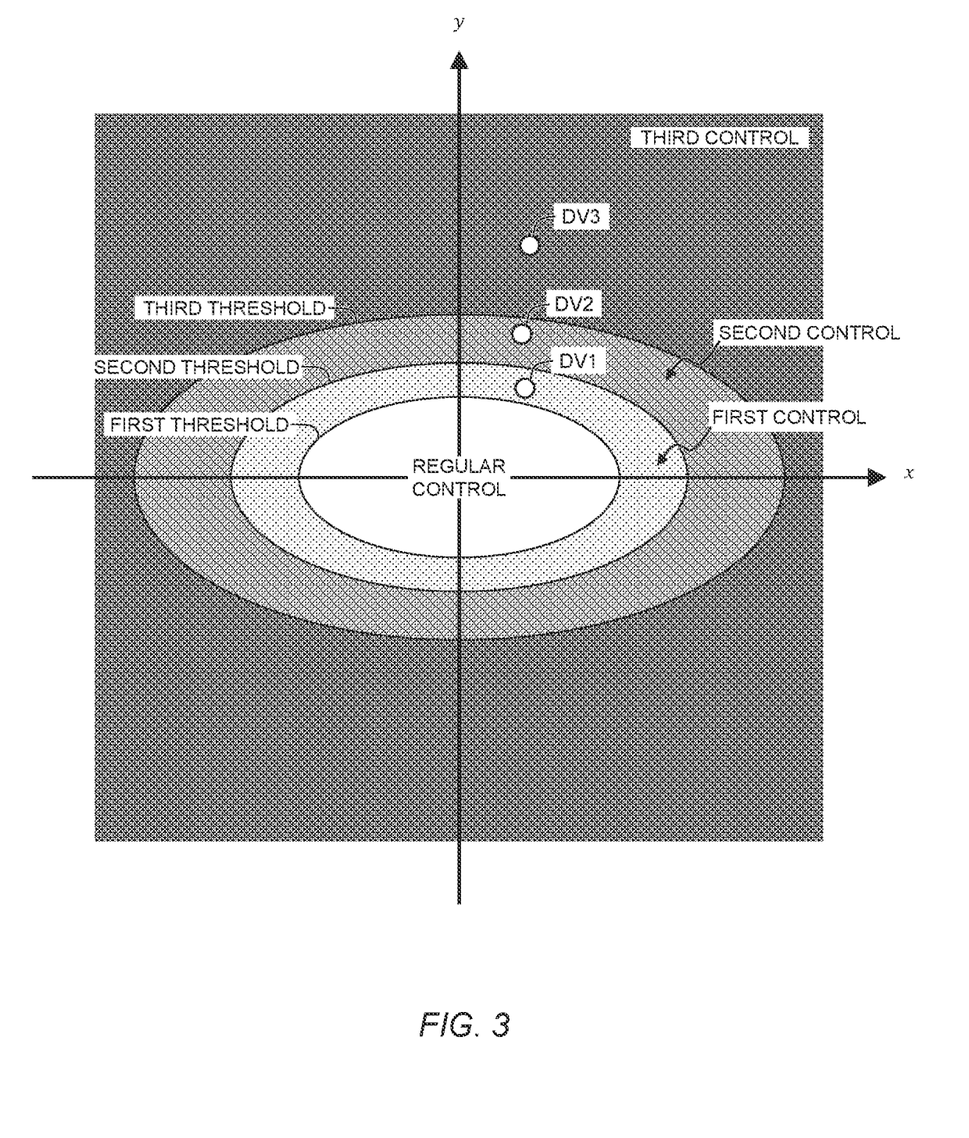
FIG. 3 is a conceptual diagram showing an example of switching an emergency control corresponding to a magnitude of a difference between an estimated position at a past predetermined time and a recalculated estimated position.

Further, the processor 110 may be configured to switch these emergency controls in accordance with the magnitude of the difference between the past calculated estimated position and the recalculated estimated position. For example, with respect to the vector of the difference between the past calculated estimated position and the recalculated estimated positioned, the processor 110 determines switching of the emergency control as shown in FIG. 3. In FIG. 3, a first threshold, a second threshold, and a third threshold are boundaries of regions in the vector space. In the case shown in FIG. 3, the processor 110 executes the first control when the magnitude of the difference vector (DV1, DV2, DV3) exceeds the first and does not exceed the second (DV1), executes the second control when the magnitude exceeds the second and does not exceed the third (DV2), and executes the third control when the magnitude exceeds the third (DV3). When the first threshold value is not exceeded, the processor 110 performs regular control. With such a configuration, it is possible to determine the poor accuracy of the estimated position of the vehicle 1 at the current time point in a stepwise manner and to execute appropriate control according to the degree of the poor accuracy failure. For example, by setting the first control to issue an alarm, the second control to retract by deceleration, and the third control to retract by stop, it is possible to request the operator to deal with the alarm, secure the control performance by deceleration, and secure the safety by stop in a stepwise manner.

The traveling device 50 and the HMI 60 operate in accordance with the control signal generated by the processor 110 executing the traveling control process, whereby the control of the vehicle 1 by the control apparatus 100 is realized.

2-5. Flowchart

Figure 4:
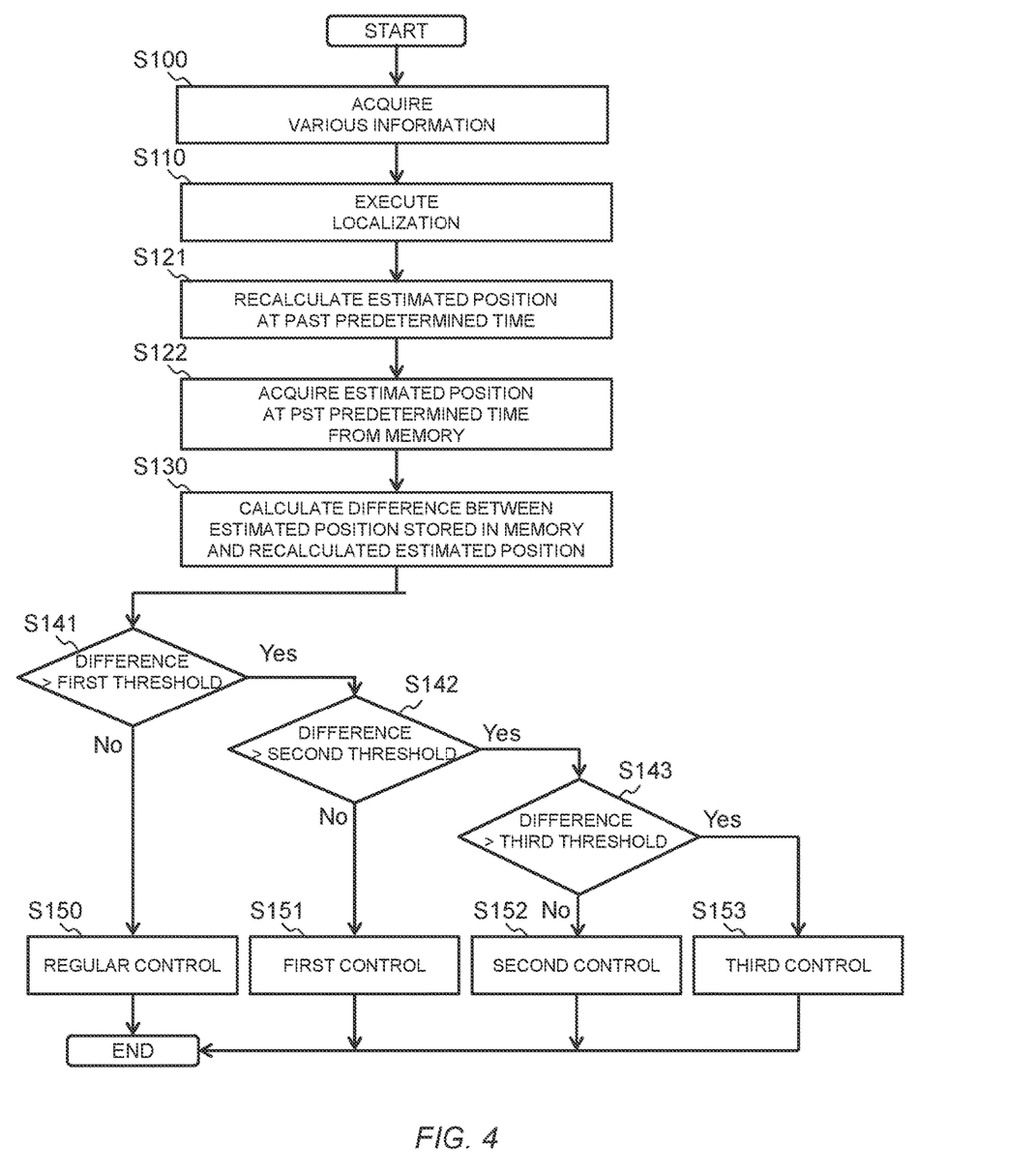
FIG. 4 is a flowchart showing an example of processes executed by a control apparatus.

FIG. 4 is a flowchart illustrating an example of processing executed by the processor 110. The flowchart shown in FIG. 4 may be repeatedly executed at predetermined intervals.

In step S100, the processor 110 acquires various kinds of information stored in the memory 120.

In step S110, the processor 110 executes localization processing to calculate an estimated position of the vehicle 1 at the current time point.

In step S121, the processor 110 executes re-estimation processing to re-calculate the estimated position (recalculated estimated position) of the vehicle 1 at a predetermined time point in the past.

In step S122, the processor 110 acquires an estimated position (estimated position at a predetermined time point) obtained by execution of the localization at a predetermined time point in the past at which the re-estimation processing was executed in step S121.

In step S130, the processor 110 calculates a difference between the past calculated estimated position acquired in step S122 and the recalculated estimated position recalculated in step S121.

When the magnitude of the difference calculated in step S130 does not exceed the first reference value (step S141; No), the processor 110 executes the regular control in the travel control process (step S150).

When the magnitude of the difference calculated in step S130 exceeds the first reference value (step S141; Yes), the processor 110 detects that the accuracy of the estimated position of the vehicle 1 at the current time calculated in the current process is poor accuracy. Then, when the magnitude of the difference exceeds the first threshold-value (step S141; Yes) and does not exceed the second threshold-value (step S142; No), the processor 110 executes the first control for issuing an alarm (step S151). When the magnitude of the difference exceeds the second reference value (step S142;

Yes) and does not exceed the third reference value (step S143; No), the second control is executed (step S152) to perform the evacuation by deceleration. When the magnitude of the difference exceeds the third reference value (step S143; Yes), the processor 110 executes the third control for performing saving by stopping (step S153).

In this way, the control apparatus 100 executes the processing. In addition, a control method related to control of the vehicle 1 is realized by the control apparatus 100 executing the processing as described above.

3. Effect

As described above, according to the present embodiment, the estimated position of the vehicle 1 at the current time is calculated based on at least the estimated position of the vehicle 1 calculated in the previous processing and the observation data up to the current time, and the control of the vehicle 1 is performed based on the calculated estimated position of the vehicle 1 at the current time. On the other hand, the estimated position (recalculated estimated position) of the vehicle 1 at a predetermined time point in the past is recalculated based on the estimated positioned of the vehicle 1 up to the current time point and the observation data up to the current time estimated position. Then, the accuracy of the estimated position of the vehicle 1 at the current time point is evaluated based on the magnitude of the difference between the estimated position (the past calculated estimated position) calculated at the estimated positioned time point in the past and the recalculated estimated position. As described above, according to the present embodiment, the vehicle 1 can perform self-tasking risk assessment on the accuracy of the estimated position of the vehicle 1 at the current time point used for control.

In this embodiment, the recalculated estimated position is calculated based on the estimated position of the vehicle 1 up to the position of the vehicle 1 up to the present time and the observation data up to the present time, and it is also possible to adopt a calculation method equivalent to the calculation of the estimated position of the vehicle 1 at the present time from the viewpoint of the type of data to be used. Therefore, the present disclosure can be easily applied to conventional control without reducing usability. Furthermore, it is not necessary to apply a plurality of calculation methods unnecessarily.

Figure 5:
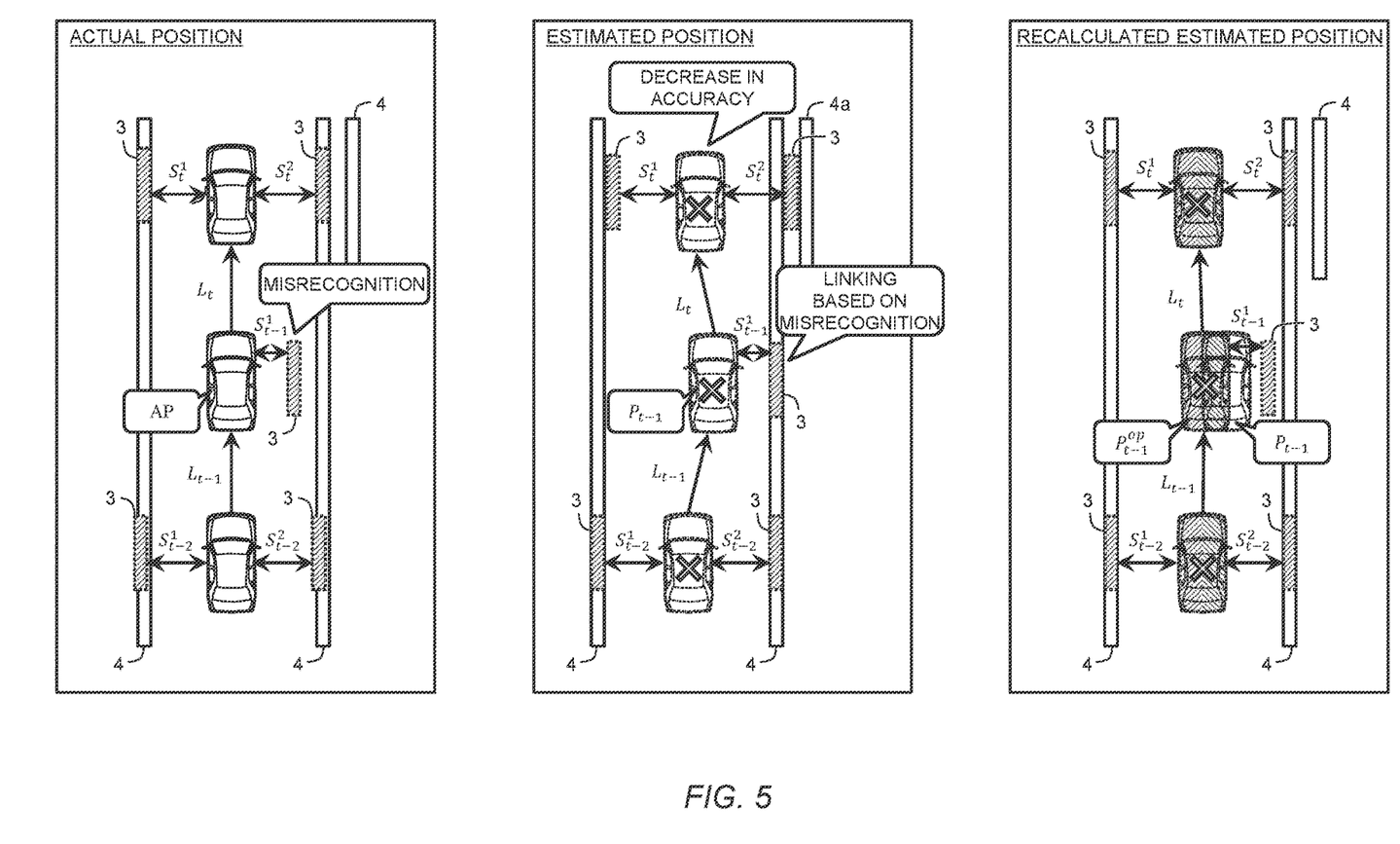
FIG. 5 is a conceptual diagram showing a practical example of the control system according to the present embodiment.

FIG. 5 is a conceptual diagram showing a practical example of the present embodiment. FIG. 5 illustrates an example of the actual position of the vehicle 1 and the recognized feature object 3, the estimated position calculated by executing the localization process with respect to the example, and the recalculated estimated position recalculated by executing the re-estimation process with respect to the example, for the current time point t and the past time points t−1 and t−2. In particular, FIG. 5 illustrates a case where erroneous misrecognition of the feature object 3 has occurred at a past time point t−1.

As illustrated in FIG. 5, when the association of the characteristic feature object 3 erroneously recognized in the localization process is performed at the past time point t−1, the calculated estimated position $P_{t-1}$ of the vehicle 1 greatly deviates from the actual position AP. Further, in the example of FIG. 5, although the feature object 3 is correctly recognized at the current time point t, due to the influence of the erroneous estimated position $P_{t-1}$ at the past time point t−1, the feature object 4a which should not be recognized becomes a target, and the association is not successfully performed. As a result, the accuracy of the estimated position of the vehicle 1 calculated at the current time point t is reduced.

On the other hand, since the recalculated estimated position $P^{op}_{t-1}$ at the past time point t−1 is recalculated based on the estimated position of the vehicle 1 up to the current time point t and the observation data up to the current time point t, it is given with higher accuracy than the estimated position $P_{t-1}$. As described above, in the case shown in FIG. 5, a difference occurs between the estimated position $P_{t-1}$ and the recalculated estimated position $P^{op}_{t-1}$ at the past time point t−1. According to the present embodiment, the estimated position of the vehicle 1 at the current time point t can be evaluated from the magnitude of the difference between the estimated position $P_{t-1}$ and the recalculated estimated position $P^{op}_{t-1}$. Further, when the difference between the estimated position $P_{t-1}$ and the recalculated estimated position $P^{op}_{t-1}$ is large to a certain extent, the emergency control is executed, so that it is possible to prevent the control from being continued while the estimated position is erroneous.

What is claimed is:

1. A control system for controlling a moving body based on an estimated position of the moving body, the control system comprising:
   one or more memories storing observation data based on information detected by one or more sensors installed in the moving body, and the estimated position; and
   one or more processors configured to execute:
   calculating the estimated position at a current time based on at least the estimated position calculated in a previous process and the observation data up to the current time;
   recalculating the estimated position at a past predetermined time based on the estimated position up to the current time stored in the memory and the observation data up to the current time;
   evaluating accuracy of the estimated position at the current time based on a difference between the estimated position at the past predetermined time stored in the memory and the recalculated estimated position at the past predetermined time;
   generating a travel plan from the estimated position;
   generating one or more control signals;
   operating the moving body based on the evaluated accuracy of the estimated position, including controlling the moving body to travel along the travel plan in accordance with the one or more control signals;
   recognizing an object around the moving body based on sensor detection information, and estimating an absolute position of the object by combining a calculated pre-estimated position and a relative position of the object;
   correcting the pre-estimated position of the object so that the estimated absolute position of the object and an absolute position of the object coincide with each other; and
   calculating a movement amount of the moving body from the estimated position based on a steering angle and a moving body speed, and calculating the pre-estimated position based on the movement amount.

2. The control system according to claim 1, wherein
   the evaluating accuracy of the estimated position at the current time includes determining that the estimated position at the current time is decrease in accuracy when a magnitude of the difference exceeds a first threshold, and
   the one or more processors are further configured to execute performing an emergency control corresponding to the magnitude of the difference when it is determined that the estimated position at the current time is decrease in accuracy.

3. The control system according to claim 2, wherein the emergency control includes:
a first control of issuing an alarm to be executed when the magnitude of the difference exceeds the first threshold but does not a second threshold;
a second control of performing evacuation by deceleration to be executed when the magnitude of the difference exceeds the second threshold but does not a third threshold; and
a third control of performing evacuation by stop to be executed when the magnitude of the difference exceeds the third threshold.

4. A control method for controlling a moving body based on an estimated position of the moving body, the control method including:
storing and managing, in one or more memories, observation data based on information detected by one or more sensors installed in the moving body, and the estimated position;
calculating the estimated position at a current time based on at least the estimated position calculated in a previous process and the observation data up to the current time;
recalculating the estimated position at a past predetermined time based on the estimated position up to the current time stored in the memory and the observation data up to the current time;
evaluating accuracy of the estimated position at the current time based on a difference between the estimated position at the past predetermined time stored in the memory and the recalculated estimated position at the past predetermined time;
generating a travel plan from the estimated position;
generating one or more control signals; and
operating the moving body based on the evaluated accuracy of the estimated position, including controlling the moving body to travel in accordance with the one or more control signals along the travel plan, the control method further comprising:
recognizing an object around the moving body based on sensor detection information, and estimating an absolute position of the object by combining a calculated pre-estimated position and a relative position of the object;
correcting the pre-estimated position of the object so that the estimated absolute position of the object and an absolute position of the object coincide with each other; and
calculating a movement amount of the moving body from the estimated position based on a steering angle and a moving body speed, and calculating the pre-estimated position based on the movement amount.

5. A non-transitory computer readable recording medium on which a computer program for controlling a moving body based on an estimated position of the moving body, the computer program, when executed by a computer, causing the computer to execute:
storing and managing, in one or more memories, observation data based on information detected by one or more sensors installed in the moving body, and the estimated position;
calculating the estimated position at a current time based on at least the estimated position calculated in a previous process and the observation data up to the current time;
recalculating the estimated position at a past predetermined time based on the estimated position up to the current time stored in the memory and the observation data up to the current time;
evaluating accuracy of the estimated position at the current time based on a difference between the estimated position at the past predetermined time stored in the memory and the recalculated estimated position at the past predetermined time;
generating a travel plan from the estimated position;
generating one or more control signals; and
operating the moving body based on the evaluated accuracy of the estimated position, including controlling the moving body to travel in accordance with the one or more control signals along the travel plan, the computer further caused to execute:
recognizing an object around the moving body based on sensor detection information, and estimating an absolute position of the object by combining a calculated pre-estimated position and a relative position of the object;
correcting the pre-estimated position of the object so that the estimated absolute position of the object and an absolute position of the object coincide with each other; and
calculating a movement amount of the moving body from the estimated position based on a steering angle and a moving body speed, and calculating the pre-estimated position based on the movement amount.

* * * * *